United States Patent
Koerkemeier et al.

(10) Patent No.: US 11,767,864 B2
(45) Date of Patent: Sep. 26, 2023

(54) FASTENING DEVICE AND METHOD FOR FASTENING AT LEAST ONE SENSOR TO A RAILWAY RAIL

(71) Applicant: SIEMENS MOBILITY GMBH, Munich (DE)

(72) Inventors: Heiner Koerkemeier, Lippstadt-Eickelborn (DE); Ulf Truemper, Wolfenbuettel (DE); Marco Clemens, Braunschweig (DE); Tobias Bauer, Berlin (DE); Horst Pech, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 1372 days.

(21) Appl. No.: 16/096,495

(22) PCT Filed: Mar. 27, 2017

(86) PCT No.: PCT/EP2017/057157
§ 371 (c)(1),
(2) Date: Oct. 25, 2018

(87) PCT Pub. No.: WO2017/186431
PCT Pub. Date: Nov. 2, 2017

(65) Prior Publication Data
US 2019/0136882 A1 May 9, 2019

(30) Foreign Application Priority Data

Apr. 25, 2016 (DE) ..................... 10 2016 206 940.3

(51) Int. Cl.
*F16M 11/00* (2006.01)
*F16B 2/06* (2006.01)
(Continued)

(52) U.S. Cl.
CPC ................ *F16B 2/065* (2013.01); *B61L 1/02* (2013.01); *B61L 1/16* (2013.01); *B61L 1/163* (2013.01);
(Continued)

(58) Field of Classification Search
CPC .... F16B 2/10; F16B 2/065; F16B 2/12; B61L 1/02; B61L 1/163; E01B 26/00; F16M 13/022
See application file for complete search history.

(56) References Cited

U.S. PATENT DOCUMENTS

| | | | | | |
|---|---|---|---|---|---|
| 1,408,301 | A | * | 2/1922 | Jeter | E04F 21/04 52/127.2 |
| 3,059,884 | A | * | 10/1962 | Stanfill | F16L 3/24 24/339 |

(Continued)

FOREIGN PATENT DOCUMENTS

| | | |
|---|---|---|
| CN | 2382747 Y | 6/2000 |
| CN | 1784330 A | 6/2006 |

(Continued)

*Primary Examiner* — Amy J. Sterling
(74) *Attorney, Agent, or Firm* — Laurence A. Greenberg; Werner H. Stemer; Ralph E. Locher (57) ABSTRACT

A fastening device for fastening at least one sensor to a railway rail includes at least one clamping bow and at least two mutually opposite clamping regions connected to the clamping bow. The at least one sensor and at least part of the railway rail can be disposed between the clamping regions. At least one clamping device is connected to the clamping bow for applying the clamping force between the clamping regions for fastening the at least one sensor to the railway rail. A sensor arrangement including the fastening device and a method for fastening at least one sensor to a railway rail are also provided.

10 Claims, 5 Drawing Sheets

(51) Int. Cl.
 *B61L 1/02* (2006.01)
 *B61L 1/16* (2006.01)
 *E01B 26/00* (2006.01)
 *F16B 2/12* (2006.01)
 *F16M 13/02* (2006.01)
(52) U.S. Cl.
 CPC ............... *E01B 26/00* (2013.01); *F16B 2/12* (2013.01); *F16M 13/022* (2013.01)

(56) References Cited

U.S. PATENT DOCUMENTS

| | | | | |
|---|---|---|---|---|
| 8,348,544 | B2 * | 1/2013 | Ollo Odriozola | E04G 17/00 403/396 |
| 8,678,297 | B2 * | 3/2014 | Schatz | F16B 2/12 24/457 |
| 9,316,488 | B1 * | 4/2016 | Sternowski | G01M 5/0091 |
| 2006/0289666 | A1 | 12/2006 | Sherriff et al. | |
| 2014/0054113 | A1 * | 2/2014 | Powell | B61K 3/00 184/3.1 |
| 2014/0241833 | A1 | 8/2014 | Grossmann | |
| 2018/0087811 | A1 * | 3/2018 | DeJarnatt | F25B 21/04 |

FOREIGN PATENT DOCUMENTS

| | | |
|---|---|---|
| CN | 203996281 U | 12/2014 |
| CN | 204915722 U | 12/2015 |
| DE | 19856341 C1 | 2/2000 |
| DE | 20012231 U1 | 1/2001 |
| DE | 102011054725 A1 | 4/2013 |
| EP | 1808531 A1 | 7/2007 |
| EP | 1960603 A1 | 8/2008 |
| GB | 2070122 B | 2/1984 |
| WO | 2012075401 A1 | 6/2012 |
| WO | 2014169385 A1 | 10/2014 |

\* cited by examiner

FASTENING DEVICE AND METHOD FOR FASTENING AT LEAST ONE SENSOR TO A RAILWAY RAIL

BACKGROUND OF THE INVENTION

Field of the Invention

In technical railway systems, sensors, such as, for example, axle counters, are frequently fastened to railway rails. To this end, fixing holes are drilled in a rail web of the railway rail, into which the sensor can then be bolted. Drilling of the rail is, though, not permitted in the case of all rail operators. In this case a fastening device can for example be employed, which is fastened to the rail foot of the railway rail and to which the sensor is then bolted. Such a fastening device is for example described in EP 1 960 603 B1. The width of the rail foot of different railway rails is, however, not always the same, so that either different fastening devices are necessary, or these must provide the possibility of adjustment to the width of the rail foot. As a result, either the number of products is high or the fastening device is complex from the design engineering perspective.

SUMMARY OF THE INVENTION

It is thus the object of the present invention to provide a fastening device and a method for fastening at least one sensor to a railway rail, which is simple from the design engineering standpoint and nevertheless suitable for different widths of rail foot.

According to the invention the problem is solved by a fastening device for fastening at least one sensor to a railway rail, with at least one clamping bow, with at least two opposite clamping regions connected to the clamping bow, between which the at least one sensor and at least part of the railway rail can be arranged, and a clamping force to fix the at least one sensor can be applied, and with at least one clamping device connected to the clamping bow, by means of which the clamping force can be applied.

The cited object is further achieved by means of a method for fastening at least one sensor to a railway rail, in the case of which the at least one sensor is positioned on the railway rail and at least the at least one sensor and the railway rail can be clamped to each other.

The inventive solution has the advantage that the sensor is fastened to the railway rail in a particularly simple manner by means of the fastening device and the method, because the sensor is essentially held on the railway rail solely by means of the generated clamping force. The sensor is connected to the railway rail in a force-locking manner, which makes assembly of the sensor particularly simple. Accordingly, the sensor need only be positioned on the railway rail and then fixed in its position with the aid of the fastening device.

The sensor and the railway rail are pressed together by the clamping force emanating from the opposite clamping regions. Further support of the fastening device on the railway rail is thus not necessary. The clamping force is applied with the aid of the clamping device. In the simplest case, the clamping device can be embodied by means of the clamping bow itself, which upon mounting, for example, is elastically deformed, and the clamping regions and the package comprising sensor and railway rail then pushed together like a spring. The sensor is fastened to the rail in a floating manner with the aid of the inventive fastening device, which makes the fastening device simple from the design engineering perspective.

In order to be able to mount the inventive fastening device in a particularly easy manner, the fastening device has at least one crossbeam element and at least two clamping bows connected to the crossbeam element in a movable manner, and the fastening device can be moved from an assembly and transport position into a fastening position. In the assembly and transport position, the fastening device can essentially be embodied in a flat form, and can thus be pushed through under the rail foot in a particularly easy manner for assembly purposes. The clamping bow is then extended into the fastening position, in which the sensor can be fastened to the railway rail. Here, the distance of the extended clamping bow is preferably embodied to match the sensor to be fastened by the crossbeam element. In the assembly and transport position, the fastening device is still particularly easy to transport and stack, as a result of which the packaging and delivery can be arranged in a particularly simple manner. A further advantage of this inventive embodiment is that the fastening device does not have to be dismantled for mounting on the railway rail. No parts can thus go missing during assembly.

The inventive solution can be further developed by means of further advantageous embodiments, as described below.

The clamping bow of the inventive fastening device can thus be designed in such a way that with the sensor fixed in place the clamping bow can be arranged without contacting the railway rail. This floating fastening has the advantage that no adaptation to different rail sizes is necessary. Furthermore, neither is any force, for example for supporting the fastening device, applied to the rail, which could have negative effects under certain circumstances.

In a further advantageous embodiment, the at least one clamping device can have at least one clamping bolt. This has the advantage that with a clamping bolt the clamping force can be flexibly adjusted across a wide range. Alternatives to the clamping bolt would be for example a tensioning lever or the elastic deformation of the clamping bow, as already mentioned above.

In order to be able to distribute and set the clamping force more effectively, the fastening device can have a multiplicity of clamping devices. The clamping devices can here in each case be arranged in oppositely located pairs, forming the clamping regions. The end of the clamping bolts can for example form the clamping regions. In one embodiment, for example, the fastening device can have four clamping bolts, by means of which the clamping force can be set very flexibly, and evenly distributed.

In order more easily to be able to find the suitable position of the sensor on the railway rail, the fastening device can have at least one adapter element, which can be arranged between railway rail and sensor. The adapter element can for example be a metal sheet, which on one side is fitted to the rail profile and on the other side has a seating for the sensor.

The invention further relates to a sensor arrangement, with a fastening device according to one of the embodiments described above and with at least one sensor, which is embodied for fastening to a railway rail. The inventive sensor arrangement can be mounted on railway rails of any desired profile in a particularly easy manner.

In an advantageous embodiment of the inventive method a fastening device for fastening the at least one sensor can be arranged at least partially underneath a rail foot of the railway rail and without contact to the rail foot. As already described above, this has the advantage that the sensor can be mounted regardless of the size of the rail foot, and no application of force to the rail foot takes place.

In order to be able to design the fastening of the sensor to be particularly simple, according to the invention the fastening device is initially arranged from an assembly and transport position at least partially underneath the rail foot, and then moved into a fastening position.

Further, at least one adapter element can be arranged between the at least one sensor and the railway rail before clamping. This has the advantage that with the aid of the adapter elements, the suitable position of the sensor relative to the railway rail can be found in a particularly simple manner.

BRIEF DESCRIPTION OF THE SEVERAL VIEWS OF THE DRAWING

The invention is explained below, with reference to the attached drawings.

DESCRIPTION OF THE INVENTION

Figure 1:
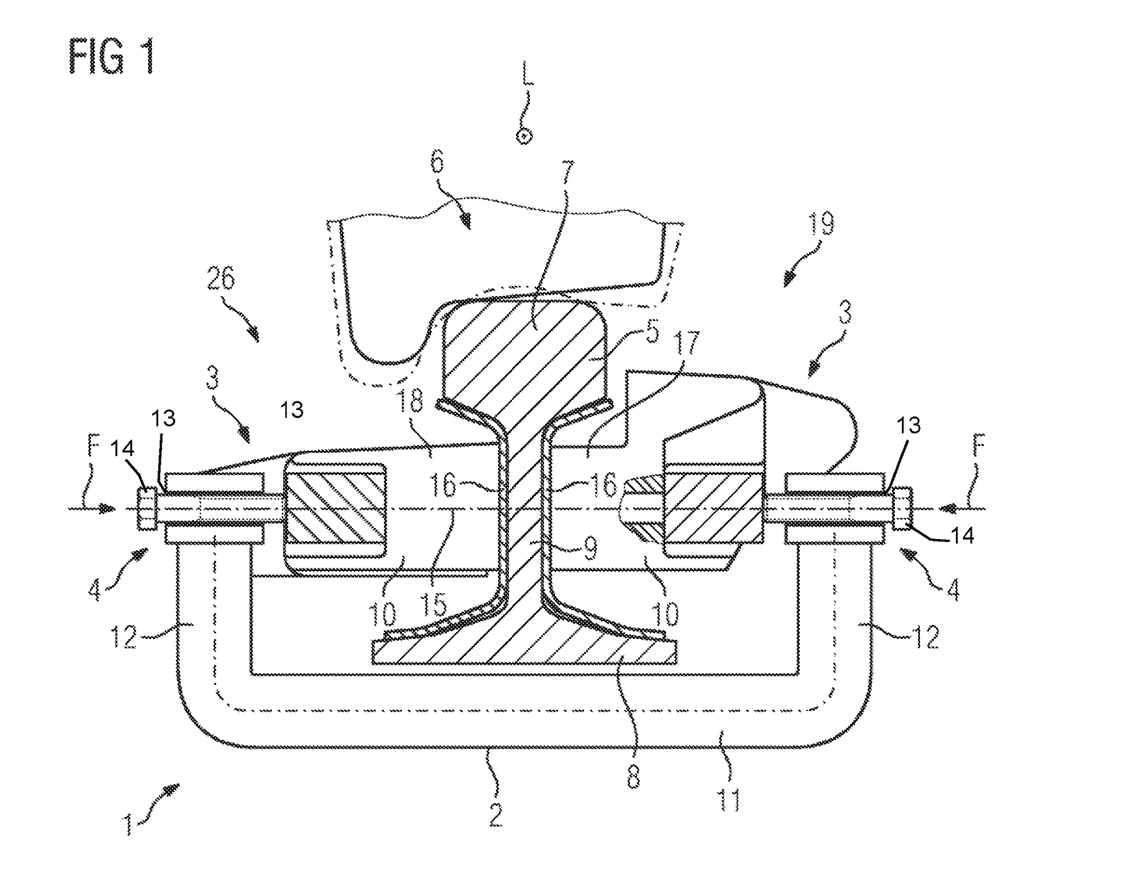
FIG. 1 shows a schematic representation of a first exemplary embodiment of an inventive fastening device.

The invention is initially explained on the basis of the exemplary embodiment in FIG. 1.

FIG. 1 shows a fastening device 1, which has a clamping bow 2, clamping regions 3 and clamping devices 4. FIG. 1 further shows a railway rail 5, on which is arranged a wheel profile 6 of a rail vehicle. Two sensors 10 are fastened on both sides in the area of a rail web 9 embodied between a rail head 7 and a rail foot 8 by means of the inventive fastening device 1.

The clamping bow 2 of the fastening device 1 is essentially embodied in a U-shaped form with two arms 12 of the same length which protrude at rights angles from a base body 11, on the ends of which are embodied threaded holes 13, in each case running parallel to the base body 11. Clamping bolts 14 are provided in the threaded holes 13. The clamping bolts 14 and the threaded holes 13 are part of the clamping device 4 of this embodiment of the inventive fastening device 1. The clamping bolts 14 in each case form a clamping region 3 of the fastening device 1 at the foot of the bolt opposite the bolt head. In the exemplary embodiment in FIG. 1, the clamping regions 3 are surfaces which contact the sensor 10, abut the latter and transfer a clamping force F. The threaded holes 13 are arranged in the fastening device 1 in such a way that they run along a straight line 15. The thus aligning threaded holes 13 and likewise aligning clamping bolts 14 have the effect that the clamping regions 3 are oriented opposite and parallel to each other.

In the exemplary embodiment shown in FIG. 1, the inventive fastening device 1 further has two adapter elements 16, which are in each case arranged between the sensor 10 and the rail web 9. On the rail side, the adapter elements 16 are in each case embodied to fit the profile of the railway rail 5. On the sensor side in turn, the adapter elements 16 are in each case embodied to fit the sensor 10 to be fastened. On the sensor side, for example, a receiving recess for the respective sensor 10 can be embodied in the adapter element 16. Alternatively, however, drilled holes or pins can also be embodied on the adapter element 16, in order to enable easy positioning of the respective sensor 10.

The two sensors 10 in FIG. 1 are for example the transmitter 17 and receiver 18 of an axle counters 19, which are mounted on both sides of the rail web 9 by means of the fastening device 1. The axle counter 19 with its sensors 10 and the inventive fastening device 1 forms an inventive sensor arrangement 26, which in FIG. 1 is mounted on the railway rail 5.

The adapter elements 16 are initially arranged on the rail web 9 for fastening the sensors 10 to the railway rail 5. The sensors 10 can then easily be positioned on the adapter elements 16, in order to guarantee a suitable horizontal and vertical orientation of the sensors 10.

The clamping bow 2 is then positioned in such a way that the clamping regions 3 are arranged on both sides of the rail web 9. The straight line 15 here runs essentially transversely to the longitudinal direction L of the railway rail 5. The clamping bolts 15 are then tightened and a clamping force F thereby generated, which presses together and clamps the package comprising the sensors 10, the adapter elements 16 and the rail web 9. The fastening device 1 fastens the sensors 10 to the railway rail 5 in a force-locking manner by means of the applied clamping force F.

In the clamped state represented in FIG. 1, the clamping bow 2 of the fastening device 1 runs with the base body 11 underneath the rail foot 8 and at a distance to the latter. The inventive fastening device 1 is thereby in contact with the sensors 10 or the railway rail 5 only via the clamping regions 3, so that a floating fastening of the sensors 10 to the railway rail 5 is realized. As the clamping regions 3 are embodied in opposite pairs, the same clamping force F applies at each clamping region 3. Accordingly, the counteracting force applied by the respective sensor 10 and the rail web 9 is equally great, so that no momentums or unilateral forces can be exerted on the railway rail 5 by the fastening device 1.

The invention is described below with reference to the further exemplary embodiment of the inventive fastening device 1 in FIGS. 2 to 4. The same reference characters are here used for the same parts, as for the embodiment in FIG. 1. For the sake of simplicity, only the differences to the embodiment in FIG. 1 are examined.

Figure 2:
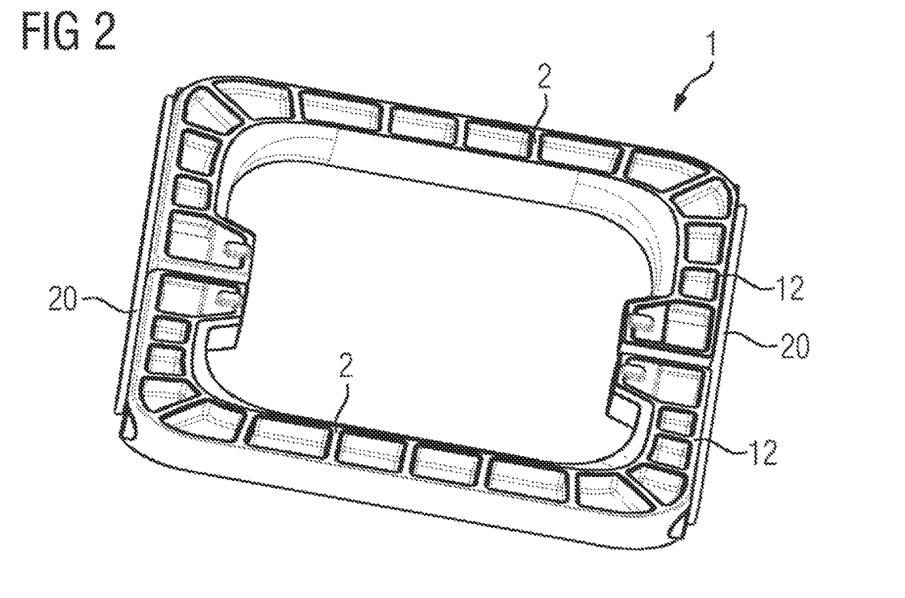
FIG. 2 shows a schematic representation of a further exemplary embodiment of the inventive fastening device in an assembly and transport position.
Figure 3:
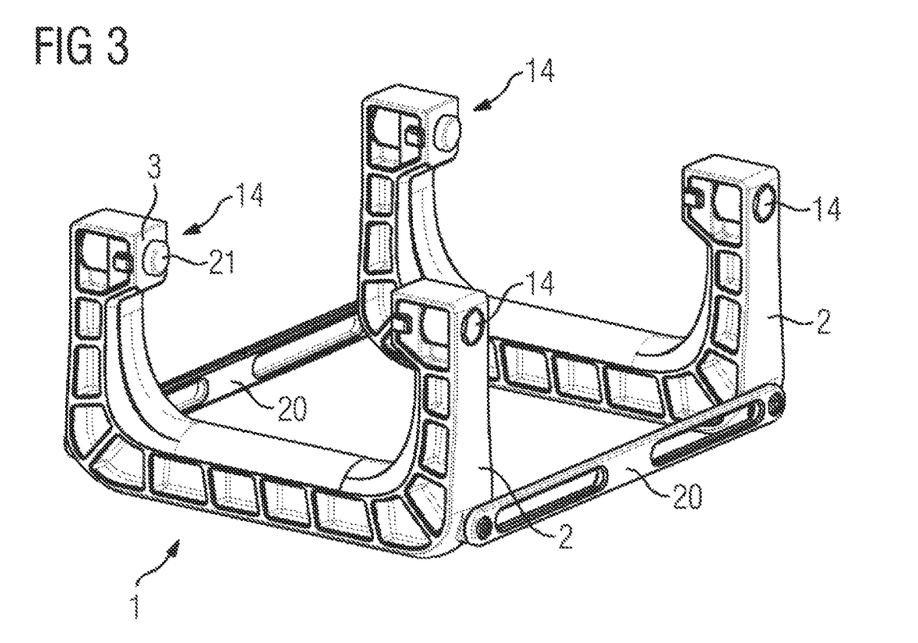
FIG. 3 shows a schematic representation of the fastening device from FIG. 2 in a fastening position.
Figure 4:
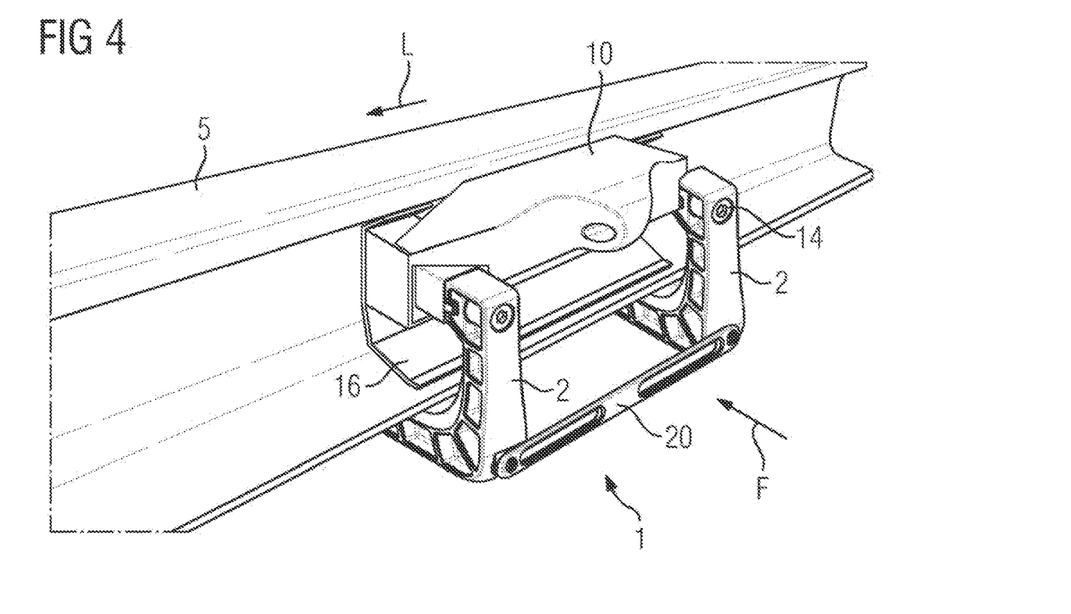
FIG. 4 shows a schematic representation of the fastening device from FIG. 2, which fastens a sensor to a railway rail.
Figure 5:
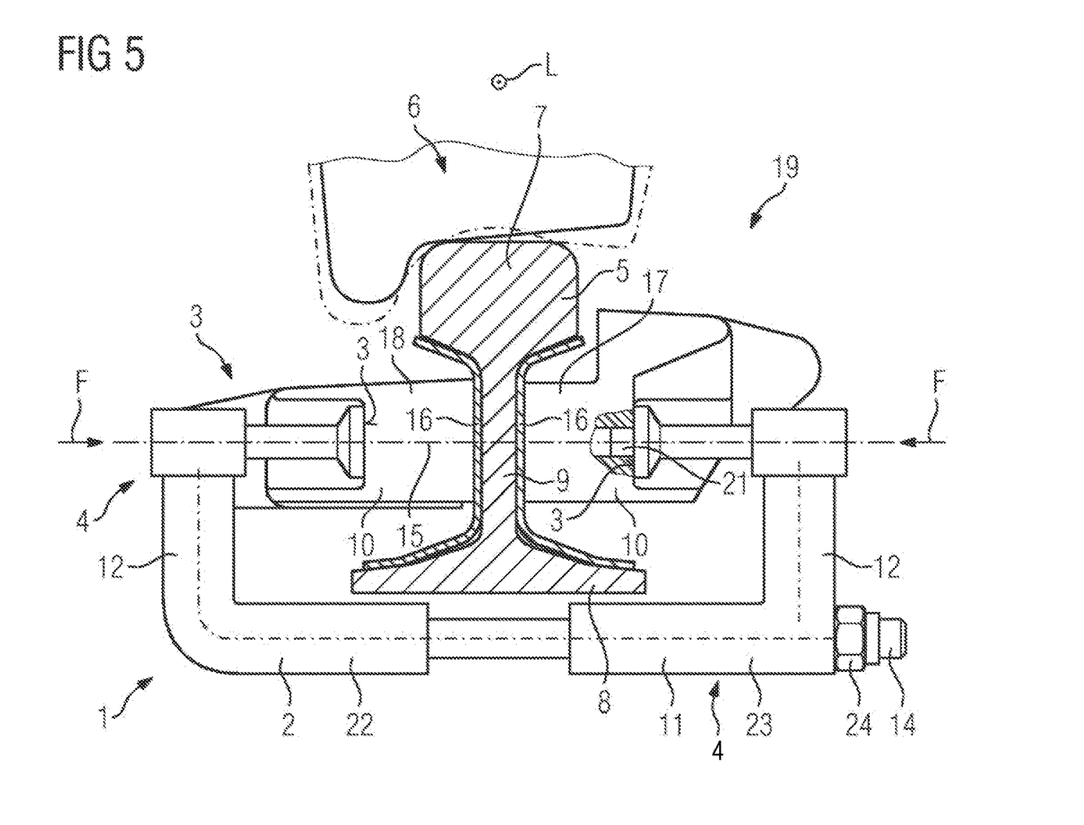
FIG. 5 shows a schematic representation of a further embodiment of the inventive fastening device.

In contrast to the embodiment in FIG. 1, the fastening device 1 in the exemplary embodiment from FIGS. 2 to 4 has two clamping bows 2, which are connected to each other via two crossbeam elements 20. At their ends, the crossbeam elements 20 are connected to the clamping bows 2 in such a way that each clamping bow 2 is movable in relation to the crossbeam elements 20. In this exemplary embodiment the bearing point is here in each case arranged approximately at the end of the base body 11 of the clamping bow 2. As shown in the FIGS. 2 and 3, the fastening device 1 can thereby be moved from an assembly and transport position represented in FIG. 2 into a fastening position represented in FIG. 3. In the assembly and transport position shown in FIG. 2, the arms 12 of the clamping bow 2 are positioned essentially parallel to the crossbeam elements 20. The two clamping bows 2 are distanced from each other by the crossbeam elements 20 in such a way that the arms 12 of both clamping bows 2 can be arranged without contact to the others in a collapsible manner and parallel to the crossbeam elements 20 in the assembly and transport position. In the assembly and transport position, the inventive fastening device 1 is thereby embodied in a particularly compact and flat form, so that it can be easily transported and stacked, and during mounting can be pushed through under the rail foot 8. In the fastening position represented in FIG. 3, the arms 12 are essentially arranged at right angles to the crossbeam elements 20. The clamping bows 2 are manually extended from the assembly and transport position into the fastening position. Here, detents can facilitate and secure the desired positioning.

In contrast to the embodiment in FIG. 1 the clamping bolts 14 in the embodiment from FIGS. 2 to 4 are arranged with countersunk bolt heads in the clamping bows 2. The clamping regions 3 are embodied as rotationally symmetrical annular surfaces at the foot of the clamping bolt 14. For simpler mounting of the fastening device 1, the clamping bolts 14 in each case have a cylindrical stud 21, which can fit into a corresponding drilled hole on the sensor 10.

FIG. 4 shows the fastening device 1 in the exemplary embodiment of FIGS. 2 to 4 in the fastening position, in which a sensor 10 is fastened to the railway rail 5. A further sensor 10 is accordingly fixed on the opposite side (not shown) of the railway rail 5 by means of the fastening device 1. The fastening device 1 in the exemplary embodiment from FIGS. 2 to 4 has four clamping devices 4 with the respective clamping bolts 14. The necessary clamping force F for the force-locking mounting of the sensors 10 on the railway rail 5 is thereby distributed across a multiplicity of clamping devices 4. The individual load, for example on the thread of the clamping bolts 14 and the threaded holes 13, is correspondingly smaller, which simplifies the design engineering of the inventive fastening device 1.

In the exemplary embodiment in FIG. 1 and in the exemplary embodiment of FIGS. 2 to 4 the clamping devices 4 are arranged particularly close to the sensors 10 in the force progression. The clamping force F is thereby generated very close to the sensors 10 without an intermediate lever.

Figure 6:
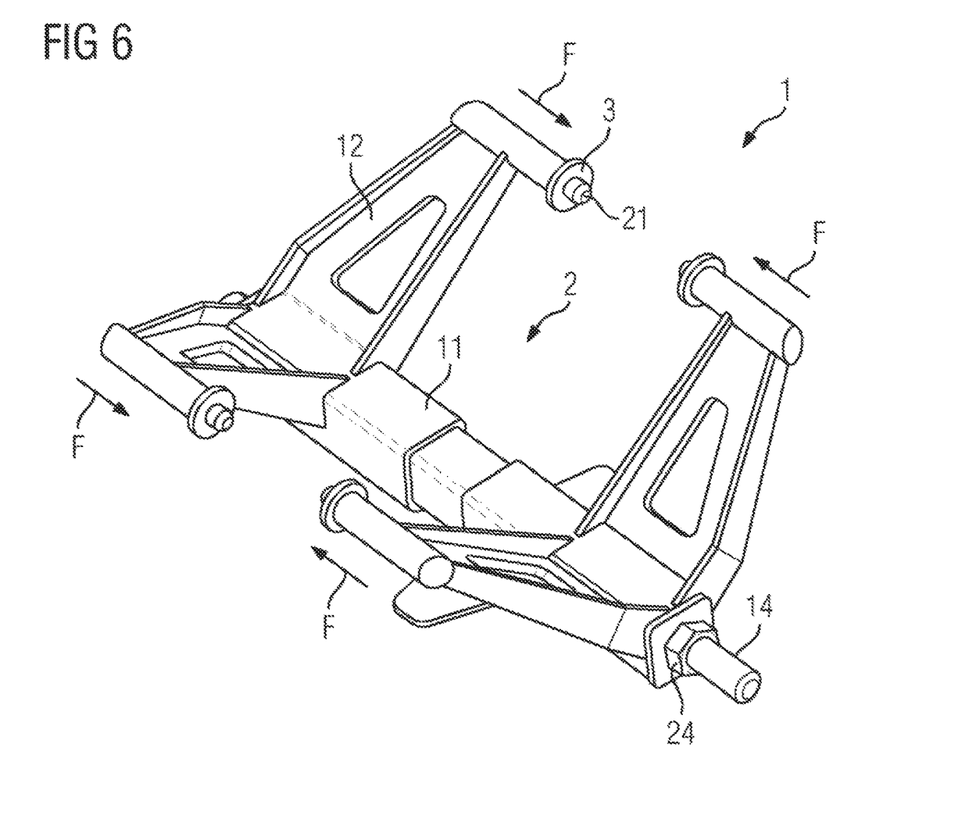
FIG. 6 shows a schematic 3D-representation of a further embodiment of the inventive fastening device.

The invention is explained below with reference to the exemplary embodiments of FIGS. 5 to 8. Once again, the same reference characters are used for the same components as the embodiments from FIGS. 1 to 4. For the sake of simplicity, only the differences to the embodiment from FIGS. 2 to 4 are examined. As the embodiment from FIG. 5 and the embodiment from FIGS. 6 to 8 are very simple, they are described jointly.

In contrast to the embodiment in FIGS. 2 to 4, the fastening device 1 in the exemplary embodiments from FIGS. 5 to 8 has only one clamping device 4. The central clamping device 4 has a clamping bolt 14, and in contrast to the embodiment in FIGS. 2 to 4 is arranged further away from the clamping regions 3 in the flux of force.

Figure 7:
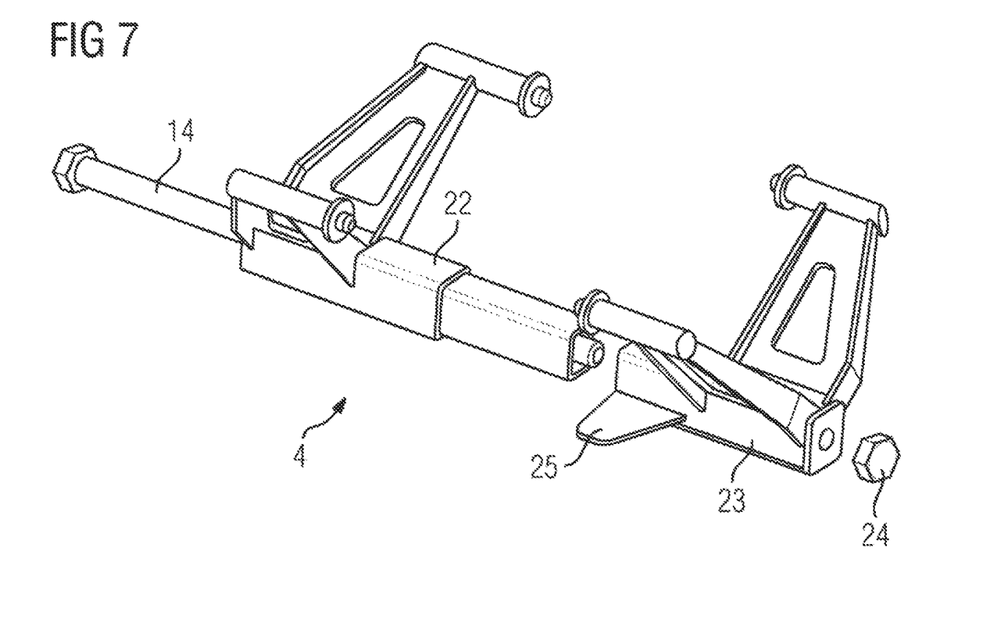
FIG. 7 shows a schematic representation of the fastening device from FIG. 6, partially dismantled.
Figure 8:
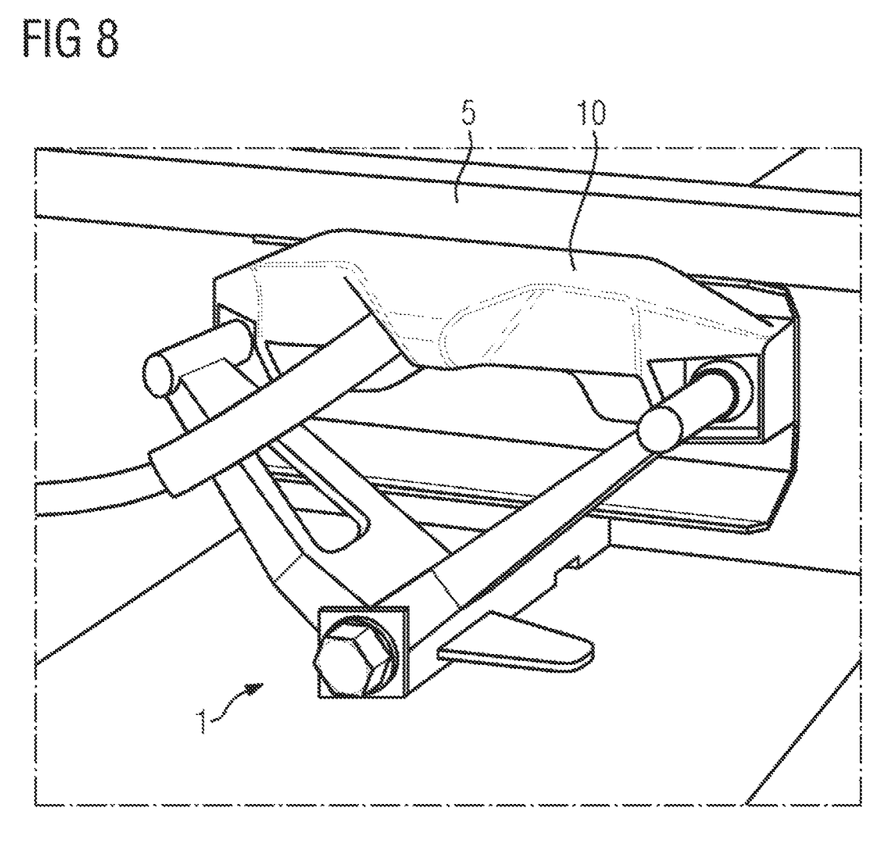
FIG. 8 shows a schematic representation of the fastening device from FIG. 6, which fastens a sensor to a railway rail.

Further, the clamping bows 2 in the embodiments from FIGS. 5 to 8 are embodied with a common base body 11. The clamping bows 2 are thereby fixed to each other and not arranged in a movable manner relative to each other, as in the embodiment from FIGS. 2 to 4. During mounting of the fastening device 1 in the embodiments from FIGS. 5 to 8 this is initially in dismantled form, as represented in FIG. 7. In the dismantled state, the base body 11 is arranged under the rail foot 8 from both sides, and reassembled there. Upon reassembly, the two parts 22, 23 of the base body 11 are again inserted into one another, and a nut 24 of the clamping device 4 is screwed onto the clamping bolt 14. Through the subsequent screwing of the nut 24 onto the clamping bolt 14, the parts 22, 23 of the base body 11 are moved against each other, and the clamping force F generated. The package comprising rail web 9, adapter elements 16 and the sensors 10 is pressed together and clamped. To protect against twisting, the fastening device 1 in the exemplary embodiments from FIGS. 5 to 8 has lateral strut elements 25. The strut elements 25 facilitate the mounting of the fastening device 1 and prevent twisting of the clamping bow 2 relative to the sensors 10, before the clamping device 4 exerts the clamping force F and thereby fastens the sensors 10.

The inventive fastening device 1 has been described in the exemplary embodiments represented in FIGS. 1 to 8, for fastening two sensors 10 on both sides of the rail web 9. The inventive fastening device 1 can of course also be used for fastening just one sensor 10 to just one side of the rail web 9. To this end, the second sensor 10 can for example be replaced by a corresponding intermediate element (not shown), or the positions of the clamping regions 3 are altered accordingly on this side of the fastening device 1 for placement directly on the railway rail 5.

The embodiments represented in the figures are exemplary only, and can of course be augmented by further embodiments, which are all encompassed by the invention.

The invention claimed is:

1. A fastening device for fastening at least one sensor to a railway rail, the fastening device comprising:
   at least one crossbeam element;
   at least two clamping bows movably connected to said crossbeam element about a bearing point for a movement of said at least two clamping bows relative to said crossbeam element between a fastening position and an assembly and transport position;
   at least two mutually opposite clamping regions connected to at least one of said at least two clamping bows, said at least two mutually opposite clamping regions being configured to receive the at least one sensor and at least a part of the railway rail therebetween; and
   at least one clamping device connected to at least one of said at least two clamping bows for applying a clamping force between said at least two mutually opposite clamping regions for fixing the at least one sensor to the railway rail.

2. The fastening device according to claim 1, wherein said at least two clamping bows do not contact the railway rail when fastening the sensor.

3. The fastening device according to claim 1, wherein said at least one clamping device has at least one clamping bolt.

4. The fastening device according to claim 1, wherein said at least one clamping device includes a plurality of clamping devices.

5. The fastening device according to claim 4, wherein said clamping devices are disposed in oppositely located pairs and form said clamping regions.

6. The fastening device according to claim 1, which further comprises at least one adapter element to be disposed between the railway rail and the sensor.

7. A sensor arrangement, comprising:
   a fastening device for fastening at least one sensor to a railway rail, the fastening device having,
   at least one crossbeam element;
   at least two clamping bows movably connected to said crossbeam element about a bearing point for a movement of said at least two clamping bows relative to said crossbeam element between a fastening position and an assembly and transport position;

at least two mutually opposite clamping regions connected to at least one of said at least two clamping bows, said at least two mutually opposite clamping regions being configured to receive the at least one sensor and at least a part of the railway rail therebetween; and at least one clamping device connected to at least one of said at least two clamping bows for applying a clamping force between said at least two mutually opposite clamping regions for fixing the at least one sensor to the railway rail; and at least one sensor to be fastened to a railway rail.

8. A method for fastening at least one sensor to a railway rail, the method comprising the following steps:

positioning the at least one sensor at the railway rail;

initially configuring a fastening device in an assembly and transport position and placing the fastening device at least partially underneath a rail foot of the railway rail;

then configuring the fastening device in a fastening position; and then clamping the at least the at least one sensor and the railway rail together.

9. The method according to claim 8, which further comprises carrying out the step of placing the fastening device at least partially underneath the rail foot without contacting the rail foot.

10. The method according to claim 8, which further comprises placing at least one adapter element between the at least one sensor and the railway rail before carrying out the clamping step.

\* \* \* \* \*

UNITED STATES PATENT AND TRADEMARK OFFICE
CERTIFICATE OF CORRECTION

| | |
|---|---|
| PATENT NO. | : 11,767,864 B2 |
| APPLICATION NO. | : 16/096495 |
| DATED | : September 26, 2023 |
| INVENTOR(S) | : Heiner Koerkemeier et al. |

It is certified that error appears in the above-identified patent and that said Letters Patent is hereby corrected as shown below:

In the Claims

Column 7, Claim 8, Lines 15-24 should read as follows:
8. A method for fastening at least one sensor to a railway rail, the method comprising the following steps:
    positioning the at least one sensor at the railway rail;
    initially configuring a fastening device in an assembly and
        transport position and placing the fastening device at
        least partially underneath a rail foot of the railway rail;
    then configuring the fastening device in a fastening position; and
    then clamping the at least one sensor and the railway rail together.

Signed and Sealed this
Thirty-first Day of October, 2023

Katherine Kelly Vidal
*Director of the United States Patent and Trademark Office*